Feb. 26, 1963  A. J. MEYER, JR  3,079,113
VEHICLE PARACHUTE AND EQUIPMENT JETTISON SYSTEM
Filed Oct. 4, 1960
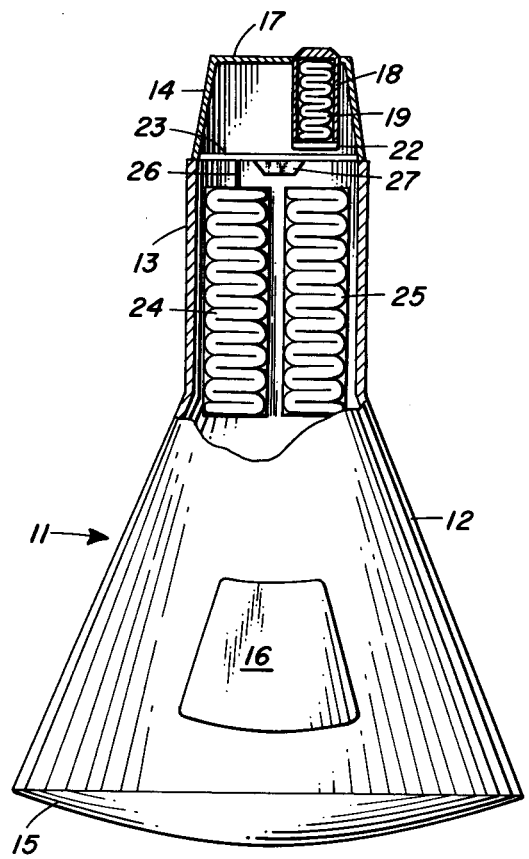
FIG. 1
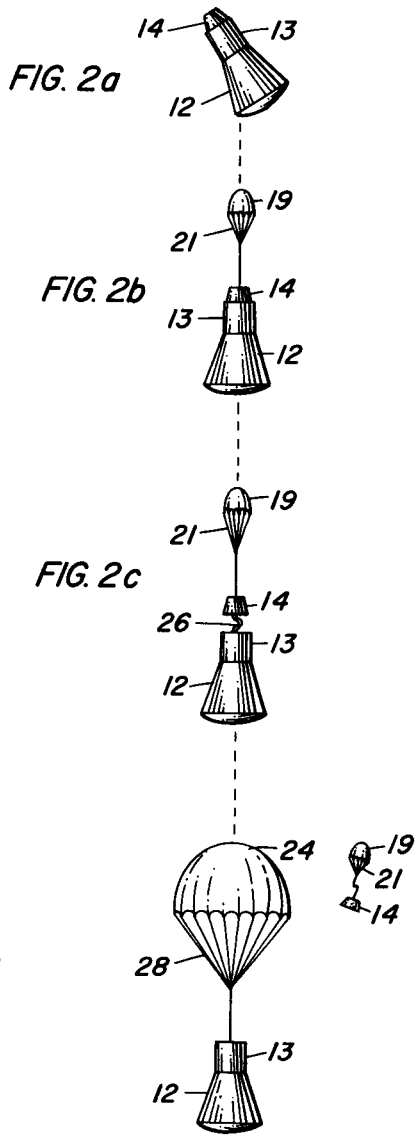
FIG. 2a
FIG. 2b
FIG. 2c
FIG. 2d
INVENTOR
ANDRE J. MEYER, JR.
BY
ATTORNEYS 3,079,113
VEHICLE PARACHUTE AND EQUIPMENT
JETTISON SYSTEM
Andre J. Meyer, Jr., Newport News, Va., assignor to the United States of America as represented by the Administrator of the National Aeronautics and Space Administration
Filed Oct. 4, 1960, Ser. No. 60,536
6 Claims. (Cl. 244—140)
(Granted under Title 35, U.S. Code (1952), sec. 266)

The invention described herein may be manufactured and used by and for the Government of the United States of America for governmental purposes without the payment of any royalties thereon or therefor.

This invention relates generally to a vehicle capable of safe descent to the earth from high altitudes, and more specifically to a vehicle having a parachute system adapted to be sequentially deployed from storage within the vehicle in a safe and reliable manner.

In recent years, due to technological advances in propulsion systems and in aerodynamics, it has become possible to send vehicles carrying various instrument packages and even passengers to greater altitudes than were formerly attainable. As capabilities for attaining greater altitudes with heavier vehicles have increased to the stage that propulsion of a manned vehicle beyond the atmosphere is possible, major problems in assuring safe return of the vehicle to the surface of the earth have arisen. Should such a vehicle be allowed to descend in free fall from altitudes above the earth's atmosphere, the vehicle would be completely destroyed upon impact with the earth. It has been suggested that such vehicles be provided with airfoils to enable a glide landing to be made, but the provision of such aerodynamic surfaces increases total vehicle weight beyond the space injection capabilities of presently available propulsion systems. It has also been suggested that one or more parachutes be provided to reduce vehicle velocity at the moment of impact. This suggestion, while it is quite practical for present vehicle sizes and configurations, and for present rocket booster capabilities, is not without serious difficulties in implementation. The parachute employed must be quite large in order to sufficiently check the heavy vehicle in its descent. The use of a necessarily large parachute requires that the vehicle be somewhat decelerated and stabilized in descent prior to deploying this large or main parachute so as to avoid damage thereto due to the opening shock upon initial deployment. This initial small decrease in velocity may be achieved by employing a drogue parachute, smaller than the main parachute. It is also desirable to provide a second large parachute, or auxiliary parachute, for use in the event of failure of the main parachute. Storage and proper sequential deployment of these various parachutes obviously would involve careful planning and design in any vehicle, but in one presently available vehicle designed for orbital missions, the problems of such storage and deployment are increased by still other considerations. More specifically, this vehicle is constructed so as to be of generally conical configuration, thus providing an apex to serve as a leading edge during launch, thereby reducing drag forces, and a highly heat-resistant blunt base, which, upon turning of the vehicle during orbital travel becomes the leading edge during reentry and descent. Passenger access prior to launching is by means of a portal in the side of the generally conical vehicle, but because of the high landing velocity, and consequent plans for landing the vehicle in water, passenger egress through this portal is infeasible. This being so, it is necessary that there be provided an exit near the apex of the generally conical vehicle, thus enabling the passenger to disembark well above the surface of the water.

The passenger seat or support in such a vehicle is near the base thereof, in order to afford maximum space for the occupant and for manually operable controls. Thus, in order to reach the apex, the passenger must pass through the portion of the vehicle which contains many of the various instruments, such as antennas, telemetering equipment, and other equipment of the vehicle. It has been determined that in order to clear a path of exit for the passenger, and to permit rapid disembarkation, certain equipment should be jettisoned prior to landing, thus providing an opening at the vehicle apex. The optimum equipment for jettisoning is that occupying the most space per unit weight, since the greatest corridor can be opened with the least effort by jettisoning such equipment. The antenna system occupies a great deal of space, but is relatively light in weight, and for this and other reasons, such as improved transmission of signals, it has been found to be desirable to place the antenna system in a jettisonable canister or housing at the apex of the vehicle, which is also the trailing edge thereof during descent. It is also considered advantageous to place the parachute system in the same portion of the vehicle, since the parachutes in deploying during descent clear a corridor for egress, and furthermore since deployment at the trailing edge is preferable. For these and other cogent reasons, the necessity of placing the parachute system and the jettisonable antenna cannister at or near the vehicle apex become obvious. The relative positioning and necessarily reliable, sequential ejection of these various devices have proved to be problems difficult of solution, however. The drogue parachute must be deployed at an altitude of ten or more miles, in order to have the desired slowing and stabilizing effects. The obvious manner of arranging the storage and sequence of operation of the parachutes would be to first jettison the canister, and then deploy the various parachutes. Such an arrangement would have serious drawbacks, however. Provision of a separate area for each of the canister, drogue parachute and main parachute, as would be necessary in such an arrangement, would be quite consumptive of space. Further, jettisoning the canister prior to deployment of any of the parachutes would result in free fall of the canister, thereby endangering the vehicle in the event of collision with the canister, or entanglement of the drogue parachute therewith. Moreover, to jettison the canister at such an altitude would entail the termination of all telemetering of condition signals and communication with the passenger during a significant and hazardous portion of the mission. Further, if canister ejection is to take place at this stage of the descent, there must be three system control operations, which may be termed "canister jettison," "drogue deployment," and "main parachute deployment." The present state of the art suggests no safe, simple, reliable improvement over the system outlined hereinbefore. The obvious disadvantages of this system or, indeed, of any suggested by the prior art, necessitated the development of a new concept of arrangement and sequencing of these various devices. The present invention is the result of such a new concept of design, arrangement and interrelation of the main and drogue parachutes and of the jettisonable canister.

Accordingly, it is an object of this invention to provide a parachute system for safely lowering a vehicle from high altitudes to the surface of the earth.

Another object of the present invention is the provision of a high altitude vehicle including a series of parachutes operable in such a sequence that a minimum of parachute actuating devices is required to insure reliable deployment performance.

A further object of the instant invention is the provision in a vehicle capable of operation at extreme altitudes including equipment jettisonable before landing, a system for positively slowing and stabilizing the vehicle, pulling free the jettisonable equipment, and actuating means to further slow vehicle descent.

Still another object of this invention is to provide in a high altitude vehicle an interrelated parachute system wherein a minimum number of operations is necessary to reliably successively decelerate and stabilize vehicle descent, jettison certain equipment, and further slow vehicle descent.

According to the present invention, the foregoing and other objects are attained by providing a vehicle capable of high velocity passage through the earth's atmosphere and having at or near the trailing edge thereof a jettisonable antenna canister containing a housing for a drogue parachute, a drogue parachute connected to the housing, and a main parachute connected to the forward portion of said canister in such a manner as to be pulled from a position of storage in said vehicle upon jettisoning said canister.

A more complete appreciation of this invention and the many attendant advantages thereof will be readily apparent as the same becomes better understood by reference to the following detailed description when considered in connection with the accompanying drawing wherein:

FIG. 1 is a partial sectional view taken along the longitudinal axis of a vehicle; and FIGS. 2a, 2b, 2c and 2d illustrate the vehicle during the sequence of events taking place in free fall, drogue parachute release, canister jettison, and main parachute deployment, respectively.

Referring now more particularly to the drawing, wherein like reference numerals designate identical parts throughout the several views, and more particularly to FIG. 1, there is shown by way of illustration a reentry vehicle, generally deignated by numeral 11, designed for orbital operation carrying a single human passenger. Vehicle 11 comprises a passenger compartment or cockpit 12 of generally frusto-conical configuration and a cylindrical parachute compartment 13 formed integrally therewith, and together constituting a main section of vehicle 11. Detachably mounted at one end of parachute compartment 13, and spaced from cockpit 12, is an equipment package, such as, by way of example, antenna canister 14, shown illustratively as frusto-coical in configuration. Formed integrally with the base portion of frusto-conical cockpit 12 is a heat shield 15 which may be shaped as a portion of a sphere and is preferably quite blunt.

Within cockpit 12 are a passenger seat or couch and various instruments and controls. Since the couch and controls form no part of this invention, they are not shown; a more detailed disclosure of these devices being found in United States patent applications Serial Number 847,023, filed October 16, 1959, and 847,027, filed October 16, 1959. In the side of vehicle 11 near the seat area is provided an entrance portal 16 through which the passenger may enter prior to vehicle launching. The details of portal 16 being conventional, it is shown only schematically.

As indicated in the hereinbefore mentioned applications, vehicle 11 is adapted to enter orbit with canister 14 foremost, but upon reentry into planetary atmosphere vehicle 11 is turned 180°, as by means of conventional steering rockets, not shown, so that heat shield 15 becomes the leading edge and end 17 of canister 14 the trailing edge of vehicle 11. Since this invention is of primary concern during and following reentry, heat shield 15 properly may be considered the leading edge and end 17 of canister 14 the trailing edge for purposes of further description.

Continuing to refer to FIG. 1, it may be seen that canister 14 has rigidly attached thereto and mounted therein a drogue parachute housing 18 which contains a drogue parachute 19 attached to housing 18 by drogue shroud lines 21, as clearly shown in FIG. 2b. The attachment of housing 18 to canister 14 and of drogue shroud lines 21 to housing 18, not shown, may be any conventional rigid connection of suitable strength. Housing 18 preferably includes one or more conventional parachute ejection devices 22, schematically shown, for forcibly ejecting drogue parachute 19, such as small explosive or mechanical ejectors. Housing 18 is preferably cylindrical in form but may take any convenient shape. Mounted in and carried by canister 14 is a conventional antenna system 23, the details of which form no part of this invention, and which is therefore shown only schematically.

Stored largely within parachute compartment 13 are a main parachute 24 and an auxiliary parachute 25. Each of these parachutes is rigidly attached through its respective shroud lines to vehicle 11 at any convenient point or points. Further, main parachute 24 is connected to canister 14 as by one or more risers or static lines 26. In practice it has been found to be desirable to provide a conventional pilot parachute, not shown, for auxiliary parachute 25. These two parachutes may be supported in compartment 13 in any desired conventional manner, such as in individual containers or by a simple system of strap supports, not shown.

Upon landing, which normally takes place at sea, the means of egress for the passenger is through parachute storage compartment 13; portal 16 being too close to the water line for safe exit. This being so, it is necessary to remove antenna system 23 and canister 14 to permit egress. In order to facilitate rapid disembarkation in the event of emergency, it is preferable to jettison canister 14, along with its antenna system 23, prior to landing. To perform the function of forcibly disconnecting canister 14 from compartment 13, jettison means 27 are provided for mechanically, hydraulically or explosively jettisoning canister 14. Any conventional jettison means, such as explosive bolts, an ejection gun, or the like may be utilized as jettison means 27, and in practice a combination of several types of such devices may be preferable.

Ejection devices 22 for the drogue parachute and jettison means 27 for the canister 14 may be actuated in any one or more of several ways. Actuating devices, not shown, which may be responsive to altitude, rate of descent, vertical acceleration or other pertinent parameters may actuate either or both the drogue ejection and antenna jettison systems as desired. Similarly, the passenger may selectively manually actuate these systems through suitable controls in cockpit 12. Finally, an observer on the Earth or in another vehicle may initiate the desired reactions through the use of telemetered commands. The control system is not shown, since the details thereof form no part of the present invention. It should suffice to say that one or all of the hereinbefore mentioned or other controls may be utilized within the scope of the instant invention.

The operation of the invention may best be understood by reference to FIGS. 2a, 2b, 2c and 2d, wherein is sequentially shown in four stages the descent of vehicle 11 toward a water landing area. The various modes of operation of the vehicle from launch through reentry are not considered part of the present invention, and, for purposes of simplicity, are omitted here, but may be understood by reference to the aforementioned applications. As vehicle 11 descends in free fall following reentry, and assumes an attitude in which heat shield 15 acts as a leading edge facing generally downwardly, FIG. 2a, some oscillation may occur, but the center of mass of vehicle 11, being close to heat shield 15, maintains the latter as the vehicle leading edge. At the desired altitude, for example ten to fifteen miles, a signal is sent by any desired command device, as hereinbefore discussed, to drogue parachute ejection devices 22 to eject drogue parachute 19. Consequently this parachute is ejected and deployed, as shown in FIG. 2b. Subsequently, at an altitude of, say, two miles, when drogue parachute 19 has had ample opportunity to check both rate of descent and incidence of oscillation of vehicle 11, a signal is directed by the preferred command device to actuate canister jettison means 27, thus separating canister 14 from compartment 13 and allowing drogue parachute 19 to pull canister 14 away from vehicle 11. As canister 14 leaves vehicle 11 it pulls with it risers or static lines 26, and consequently main parachute 24, FIG. 2c. Finally, canister 14 is pulled entirely clear of vehicle 11, and as risers 26 separate in conventional fashion, main parachute 24 is fully deployed and through its shrouds 28, FIG. 2d, lowers vehicle 11 gently to landing.

There is sufficient force in jettison means 27 that, should drogue parachute 19 fail to deploy, either through failure of ejection devices 22 or some other malfunction, the residual force of such means over and above that required to separate canister 14 from vehicle 11 is sufficient to carry the canister clear of vehicle 11, with the attendant deployment of main parachute 24. Aerodynamic drag on canister 14 subsequent to separation also aids this operation. Further, in the event that the automatic system for jettisoning canister 14 fails to function, manually operable mechanical means may be provided which can be operated to insure canister jettisoning and main parachute deployment. Should main parachute 24 fail to deploy, auxiliary parachute 25 may be ejected in conventional fashion.

It should be noted that one advantage of the instant invention is the fact that under normal operating conditions only two command signals are needed to successively deploy drogue parachute 19, jettison canister 14, and deploy main parachute 24. Consistent with the system control terminology used hereinbefore, these commands are "drogue deployment" and "canister jettison." Thus it may be seen that the "main parachute deployment" command is eliminated entirely. Elimination of the necessity of this command signal is of major import due to the resultant saving in program equipment complexity, passenger preoccupation, and observer equipment and involvement. This is so because, whether a computer control device, the passenger, or an observer, or all of them, is delegated the responsibility of properly jettisoning canister 14 and deploying the various parachutes, a reduction in the number of operations necessary to accomplish this result reduces the complexity of the equipment involved, and reduces the possibility of error, which could be disastrous. Thus the elimination of any function required of one or all of these controlling agencies may determine success or failure of the entire mission.

In summary, it may be seen that this invention solves the acute problem of safely landing a high altitude vehicle in a novel and useful way by providing a system of parachutes and jettisonable equipment stored in such a way as to require a minimum of space, and constructed to coact in such a manner as to necessitate a minimum number of operative steps to insure reliable functioning.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A vehicle capable of carrying a passenger and adapted for parachute retarded descent through a planetary atmosphere comprising a main section including a passenger compartment and a parachute compartment, said parachute compartment further defining an egress passageway between said passenger compartment and the exterior of said vehicle, a main parachute stored in said parachute compartment, a canister adapted for carrying eqiupment useable in the operation of said vehicle prior to a terminal phase of parachute retarded descent of said vehicle yet expendable thereafter detachably mounted on said parachute compartment, a drogue parachute housing mounted within and fixed to said canister, a drogue parachute stored within said housing, means connecting an element of said drogue parachute to said canister, means connecting an element of said main parachute to said parachute compartment, means for ejecting said drogue parachute from said housing, means for connecting an element of said main parachute to said cannister and means for detaching said canister from said parachute compartment thereby to deploy said main parachute from said parachute compartment.

2. A vehicle as set forth in claim 1 including a leading edge and a trailing edge, said drogue parachute and said main parachute being stored and connected for deployment along the longitudinal axis of said main section towards said trailing edge.

3. A parachute and jettisonable canister system for use in a vehicle for parachute retarded descent through a planetary atmosphere, comprising: a space vehicle; a first parachute; a housing for said first parachute; an expendable canister; communication equipment carried within said expendable canister usable in the operation of said space vehicle prior to a terminal phase of parachute retarded descent of said space vehicle; said housing forming a separate compartment and being fixed to said canister; said space vehicle including a parachute compartment, said canister being detachably secured to said parachute compartment, a second parachute connected to said parachute compartment, and means connecting said second parachute to said canister.

4. A parachute system as set forth in claim 3 including means for forcibly ejecting said first parachute from said housing.

5. A parachute system as set forth in claim 3 further including means for forcibly separating said canister from said compartment.

6. A parachute system as set forth in claim 3 further comprising means connecting said first parachute to said housing, means for forcibly ejecting said first parachute from said housing, and means for forcibly separating said canister from said compartment.

References Cited in the file of this patent

UNITED STATES PATENTS

| | | |
|---|---|---|
| 2,326,813 | Wilson | Aug. 17, 1943 |
| 2,702,679 | Culver | Feb. 22, 1955 |
| 2,798,683 | Swenson | July 9, 1957 |

OTHER REFERENCES

The Evening Star Newspaper, March 26, 1959, Washington, D.C., page A-5.

Western Aviation Magazine, November 1959 (pages 6, 7 and 8 relied upon).